United States Patent [19]

Inagaki et al.

[11] Patent Number: 5,797,604
[45] Date of Patent: Aug. 25, 1998

[54] METAL GASKET

[75] Inventors: Toshiyasu Inagaki; Yoshinori Morooka; Akihiro Kojima, all of Komaki, Japan

[73] Assignee: CKD Corporation, Japan

[21] Appl. No.: 764,879

[22] Filed: Dec. 16, 1996

[30] Foreign Application Priority Data

Dec. 25, 1996 [JP] Japan .......................... 7-351467

[51] Int. Cl.⁶ .............................................. F16J 15/08
[52] U.S. Cl. .................... 277/618; 277/633; 277/647; 277/653
[58] Field of Search ....................... 277/164, 205, 277/236, 618, 633, 647, 653

[56] References Cited

U.S. PATENT DOCUMENTS

| | | | |
|---|---|---|---|
| 3,285,615 | 11/1966 | Trbovich | 277/206 R |
| 3,325,892 | 6/1967 | Delgodo | 277/205 |
| 4,452,462 | 6/1984 | Karr, Jr. | 277/206 R |
| 4,561,662 | 12/1985 | De Villepoix et al. | 277/205 |
| 5,022,663 | 6/1991 | Fages et al. | 277/236 |
| 5,354,072 | 10/1994 | Nicholson | 277/206 R |

FOREIGN PATENT DOCUMENTS

| | | | |
|---|---|---|---|
| 301920 | 11/1917 | Germany | 277/205 |
| 2-138575 | 5/1990 | Japan . | |

*Primary Examiner*—Daniel G. DePumpo
*Attorney, Agent, or Firm*—Finnegan, Henderson, Farabow, Garrett & Dunner, L.L.P.

[57] ABSTRACT

A metal gasket excellent in sealing performance and capable of sealing with a small pressing force. The metal gasket comprises at least one metal sheath with a C-shaped cross-section and a ring elastic core surrounded by the metal sheath. The metal gasket provides a seal upon exertion of a force in the axis center direction. The metal sheath has a locally thin cross-section over the whole annular length, and when the metal sheath subject to a force and deformed, the deflection in the axis direction of the metal sheath due to concentrated stress on the thin worked portion causes the formation projections at both sides of the deflection which projections are pressed onto the sealing face to form air-tight seals.

14 Claims, 5 Drawing Sheets

METAL GASKET

BACKGROUND OF THE INVENTION

1. Field of the Invention

This invention relates to a metal gasket for obtaining high air-tightness resulting from pressing on seal face of a sealing portion on which the metal gasket is placed.

2. Description of Related Art

In the manufacturing process of semiconductors, processes for thermodiffusing ultra-toxic gases such as silane, arsine, phosphine, and diborane on a silicon wafer base as impurity source have been employed and spontaneously-ignitable gases have been used.

Such gases when used in the manufacturing process of semiconductors involves the risk of direct physical injury. For example, the lethal dose of arsine is 0.5 ppm and a little leakage of the gas causes physical injury. Conventionally piping for such gas has been jointed by welding or sealing using a gasket for preventing leakage. Because such gases are usually toxic and also corrosive, a gasket consisting of rubber or resin can not be used and a metal gasket has been used for gasket sealing.

For equipment for manufacturing of semiconductors which involves handling of such hazardous gas, various metal gaskets has been proposed and used for high air-tightness. The conventional metal gasket will be described referring to the following examples.

FIG. 6 is a perspective view for illustrating the first conventional example of a metal gasket. The metal gasket 51 comprises a metal sheath with two layers, namely, an inside-sheath 53 and outside-sheath 54, and a cross-section in the form of C-shape. The sheaths are provided adjacent each other in the axial direction and a metal core 52 comprising an elastic metal coil spring in the shape of a ring provided on the inside of the inside-sheath 53.

The second example of a conventional metal gasket disclosed in Japanese Unexamined Patent Publication No. Hei 2-138575 is shown in FIG. 7. The metal gasket 61 comprises a metal core 62 comprising a ring-shaped hollow elastic metal coil spring with an elliptic cross-section and an outside single-layer metal sheath 63 with a C-shaped cross-section surrounding the peripheral surface of the metal core 62 continuously in the axial direction.

When a gasket 61 having such a structure receives a compression force exceeding a prescribed value from the bracket 60 in the minor axis direction, the top and bottom sides deflect at the central portions to form arched surfaces 64 and 64 respectively as shown in FIG. 8, and two circles 65 and 66 adjacent the arched surfaces 64 and 64 serve to seal the top and bottom faces. High sealing effect is exhibited by doubled sealing lines.

However, recently it is desirable to use austenite stainless steel, particularly SUS316 (referred to as merely SUS hereinafter), for it is excellent in corrosion resistance as a sheath material of metal gaskets instead of nickel which also can generate poison through reaction with a gas. However, SUS is disadvantageous in that the stability of sealing is poor.

The reason is as follows. SUS316 has a high hardness of about Hv 320 in comparison with the hardness of nickel on the outside sheath surface of Hv 180. On the other hand, a flange on which the metal gasket is to be mounted has a hardness of about Hv 300 because the flange is formed of SUS316 or VIM-VAR material subjected to burnishing surface processing.

Accordingly, when a sheath consisting of nickel is used and there is hardness difference between a flange and the sheath, the sealing portion is strained on the sealing face of the bracket to ensure air-tight sealing.

However, when there is no hardness difference between a flange and the sheath because high hardness material such as SUS is used for the sheath, the metal gasket is not strained to fit evenly on the sealing face, the stability of sealing is poor, and poor sealing is a problem.

When there is hardness difference between a flange and the sheath because nickel is used for the sheath, the sheath is pressed on the sealing face with high pressure to cause strain, the material of the sheath is forced to penetrate into the sealing face of the flange to enhance the air-tightness.

However, when there is no hardness difference between the sheath of high hardness material such as SUS and a flange, both the gasket of the first example with a circular cross-section (FIG. 6) and of the second example which forms double sealing lines with elliptic cross-section (FIG. 7) contact a bracket at the curved surface to obtain increased contact surface area. Such contact between surfaces involves low areal pressure, and the material of the sheath is not forced to penetrate to the sealing faces and does not enhance the air-tightness. Thus, is disadvantageous in that the stability of sealing is poor.

Therefore, a very high pressing force is required to enhance the sealing stability.

It is the object of the present invention to provide a metal gasket excellent in sealing stability without such problem and capable of effectively preventing the leakage of fluid from with a reduced pressing force.

SUMMARY OF THE INVENTION

To achieve the objects and in accordance with the purpose of the invention, as embodied and broadly described herein, the metal gasket of this invention comprises at least one metal sheath with a C-shaped cross-section and a ring elastic core surrounded by the metal sheath, said gasket functioning to prevent leakage of fluid during contact with a sealing face and when subjected to a force in the axis center direction, wherein the metal sheath has a thin-walled portion formed at a location on the periphery of the metal sheath which is to be contacted by the sealing face, and when a force is exerted upon the metal gasket to deform the sheath, a deflection occurs in the axis center direction as a result of the stress concentration on the thin-walled portion which causes projections to be formed at both sides of the deflection which projections are pressed onto the sealing face to prevent leakage of fluid.

The metal gasket of this invention further comprises at least one metal sheath and designed for providing sealed contact with an opposing surface under an exerted force, the metal sheath having a periphery and a thin-walled surface with first edges formed on the periphery, and in response to a force exerted upon the gasket causing the sheath to deform and the thin-walled surface to deflect inwardly, the gasket further comprising first projections formed at the first edges which projections press into the opposing surface to prevent leakage of fluid.

The metal gasket of the present invention has the above-mentioned thin walled portions on both sides of the above-mentioned metal sheath in the above-mentioned metal gasket.

The metal gasket of the present invention has a flat thin walled portion of the above-mentioned metal sheath in the above-mentioned metal gasket.

The metal gasket of the present invention has a thin-walled portion of the above-mentioned metal sheath with U-shaped, V-shaped, or ⊐-shaped cross-section in the above-mentioned metal gasket.

A metal gasket of the present invention having the above-mentioned structure functions as described hereinafter.

When the metal gasket is provided on the portion to be sealed and pressed by a force in the axis center direction, the stress concentration on the thin walled portion formed on the metal sheath causes the deflection and deformation of the thin walled portion. The deflection in the axis center direction of the metal sheath due to stress concentration causes projections to be formed at both sides of the deflection which projections mark double sealing lines as the result of the contact. Because the edge of a projection is pressed onto the sealing face on each sealing line, the areal pressure at the tip of the edge is high and such high areal pressure is favorable for preventing leakage of fluid.

In other words, the metal gasket forms double sealing lines, the tip of the sealing line contacts the sealing face with high contact pressure to provide the sealing stability.

The metal gasket of the present invention having the above-mentioned worked portion with a flat face worked to form a locally thin portion is pressed to form projections at both sides of the deflection in the axis center direction at the middle portion of the locally flat thin portion, and the double sealing line which is in contact on the sealing face with a high contact pressure favors the sealing stability.

The flat face can be formed simply by cutting the end of the metal sheath, and manufacturing cost is therefore low.

The metal gasket of the present invention has a metal sheath having the above-mentioned worked portion with a U-shaped, V-shaped, or ⊐-shaped groove cross-section worked to form a local thin portion, and the compression exerted on the metal gasket causes projections to be formed at both sides of the deflection which are formed by deflecting in the axis center direction the thin portion at the recessed middle portion of the ⊐-shaped groove, or the bottom of U-shaped or V-shaped groove of the above-mentioned worked portion, thus the double sealing lines which are in contact with the sealing face with a high pressure favors the sealing stability.

DETAILED DESCRIPTION OF THE PREFERRED EMBODIMENTS

Figure 1:
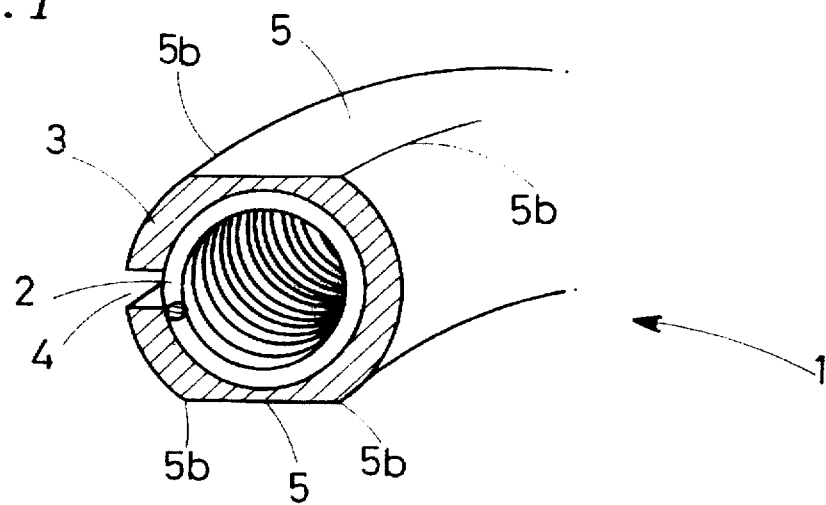
FIG. 1 is a perspective view for illustrating the first embodiment of a metal gasket in accordance with the present invention.

Embodiments of metal gaskets in accordance with the present invention will be described hereinafter by referring to the drawings. FIG. 1 is a cross-sectional perspective view for illustrating a metal gasket 1 of the first embodiment. The metal gasket 1 comprises a sheath 3 which is continuous in the axial direction and has a C-shaped cross-section, and a ring elastic metal coil spring 2 which is surrounded by the sheath 3. The metal gasket 1 of this embodiment is featured by the sheath 3, that is, flat faces 5 and 5 are formed over the whole length of the metal gasket 1 at the top and bottom symmetrically with respect to the opening 4 of the sheath 3 with C-shaped cross-section. The sheath 3 is formed of SUS316 with a hardness of about 320 Hv.

Figure 2:
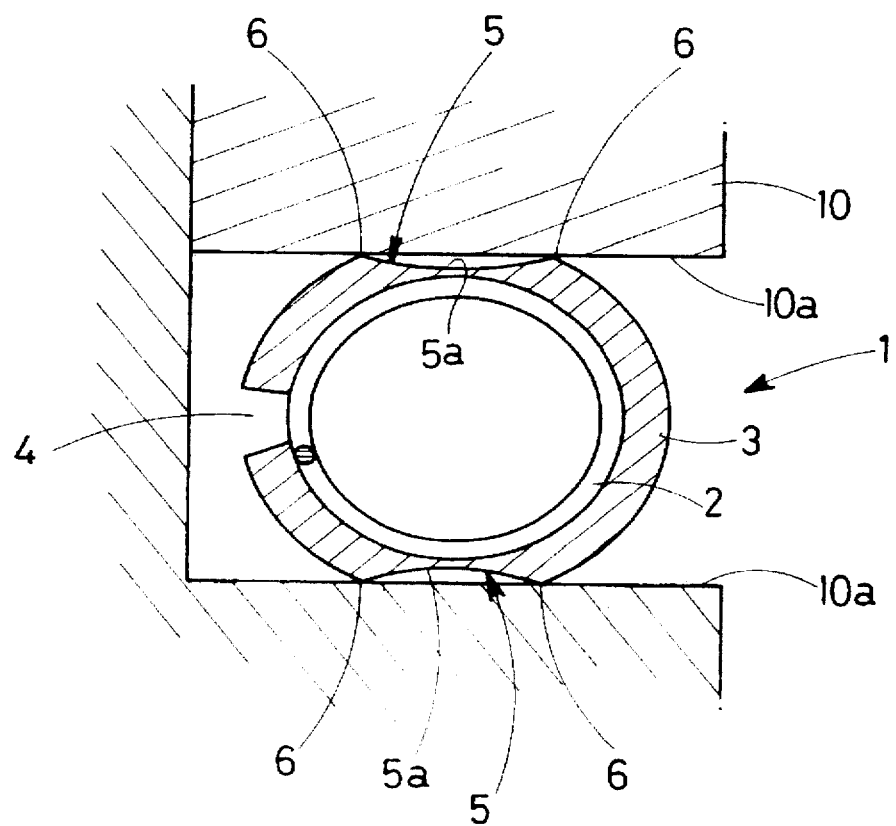
FIG. 2 is a cross-sectional view for illustrating a profile during sealing of the metal gasket of the first embodiment.

Such a metal gasket 1 is placed on a flange to be sealed and compressed, and the profile of the metal gasket under such condition is shown in FIG. 2. When the metal gasket 1 is placed on the sealing faces 10a and 10a of the flange 10, the flat faces 5 and 5 are brought into contact with the sealing faces 10a and 10a. When the flat faces 5 and 5 facing each other receive a compression force from the flange 10, the metal gasket 1 is deformed in the direction of the central axis.

When, because the sheath 3 exerted with a force from the flange 10 is structured so that the center portions 5 and 5 are formed thinnest and the portions farther from the center are formed thicker, the force is exerted onto the central portions 5a and 5a to cause local stress concentration. Thus, the sheath 3 is deflected and curved in the axis center direction namely the direction of the force at the central portions 5a and 5a as the result of the stress concentration, and the edges 5b and 5b of the flat faces 5 and 5 become projections 6 and 6 between the central portions 5a and 5a. The projections 6 and 6 are obtained along the whole annular length of the metal gasket 1 to render the double sealing of the sealing faces 10a and 10a of the flange.

Figure 3:
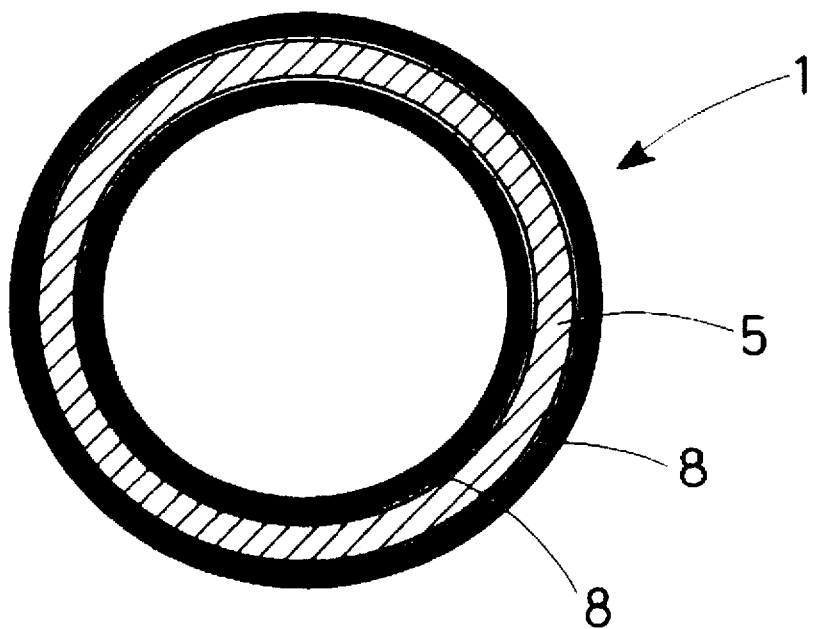
FIG. 3 is a plan view of a profile after sealing of the metal gasket of the first embodiment.
Figure 9:
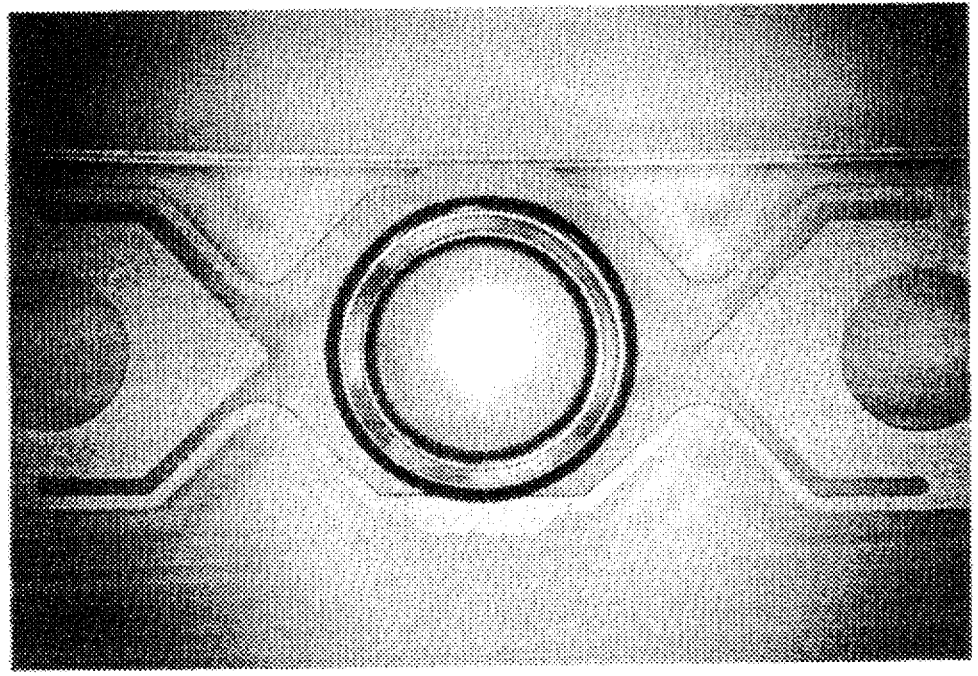
FIG. 9 is a photograph for illustrating a condition after sealing of the flat face of the metal gasket of the first embodiment in accordance with the present invention observed by a microscope.

By the way, the sealing face of the flange 10 at the portion where the projections 6 and 6 obtained by compression deformation make contact has been tested. A photograph of the flat face of the metal gasket after sealing is shown in FIG. 9. FIG. 3 is a plan view of the metal gasket 1 after sealing which is the schematic description of FIG. 9.

As shown in the photograph of FIG. 9 and in FIG. 3, the metal gasket 1 comprises a coil spring 2 surrounded by the sheath 3, and the flat faces 5 and 5 are formed by cutting the top and bottom portions for the purpose of sealing. Where such metal gasket is mounted on the flange 10 and taken out to observe, it is found clearly that there are circular outside and inside double sealing prints 8 and 8 at the positions corresponding to the edges 5b formed on the flat face 5.

Accordingly, it is confirmed that the metal gasket 1 of the embodiment seals the sealing faces 10a and 10a with aid of the projections 6 and 6, formed by compression because of the existence of worked flat faces 5 and 5.

The metal gasket 1 of the embodiment is applied both to the case where the sealing face 10a and 10a of a flange are subjected to super roll processing to provide a smooth surface with reduced pits and to the case where the sealing face 10a and 10a of a flange are not subjected to super roll processing, and a leakage test is repeated a plurality of times for testing the leakage of helium to the outside after 30 seconds from the start of blowing of helium. The result shows no outside leakage for all tests. The hardness of the flanges 10 is all about 300 Hv and the detection sensitivity is 2.8×10-12 Pa·m³/s or lower.

Accordingly, because the sharp projections 6, 6 contact the sealing faces 10a and 10a at a small sealing area for sealing by the aid of the projections 6, 6 of using the metal gasket 1 of the embodiment, the high pressing force is applied evenly on the contact areas, and the faces 10a and 10a—not only with a smooth surface but also with a rough surface are sealed stably.

A high air-tightness is obtained by the sealing lines of the projections 6, 6 which form a double seal.

Further, the metal gasket contact the sealing faces 10a and 10a only on the double sealing lines formed by the projections 6, 6 with a small contact area, and because of the small contact area, high contact pressure can be obtained with a small tightening force exerted on the flange 10 which exerts a force to press the metal gasket.

On the other hand, because the use of the flange 10 consists of a soft material with a hardness of 120 to 130 Hv a permanent sealing print is formed on the sealing faces 10a and 10a. Repeated attaching and detaching of the metal gasket will cause crossing of sealing prints. However, no leakage results even after repeated use because of high pressure on the projections 6, 6 and double sealing lines.

Figure 4:
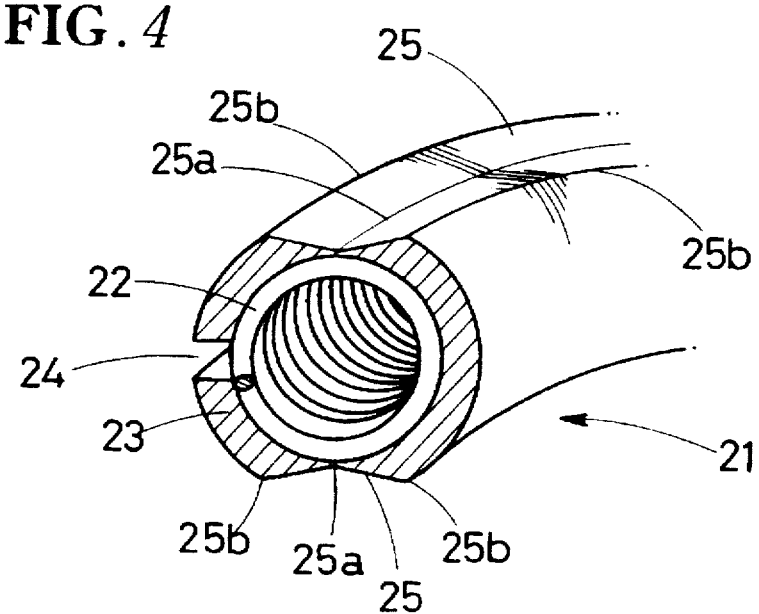
FIG. 4 is a cross-sectional perspective view for illustrating the second embodiment of a metal gasket in accordance with the present invention.

Next, the second embodiment of a metal gasket in accordance with the present invention will be described. FIG. 4 is a cross-sectional perspective view for illustrating a metal gasket 21 of the second embodiment. As in the configuration of the first embodiment, this gasket 21 also comprises a sheath 23 with a C-shaped cross-section and a coil spring 22 which is surrounded by the sheath 23. The sheath 23 includes the features of the metal gasket 21 of this embodiment. V-shaped grooves 25 and 25 are formed over the whole annular length of the metal gasket 21 at the top and bottom symmetrically with respect to the opening 24 of the which has the C-shaped cross-section.

Figure 5:
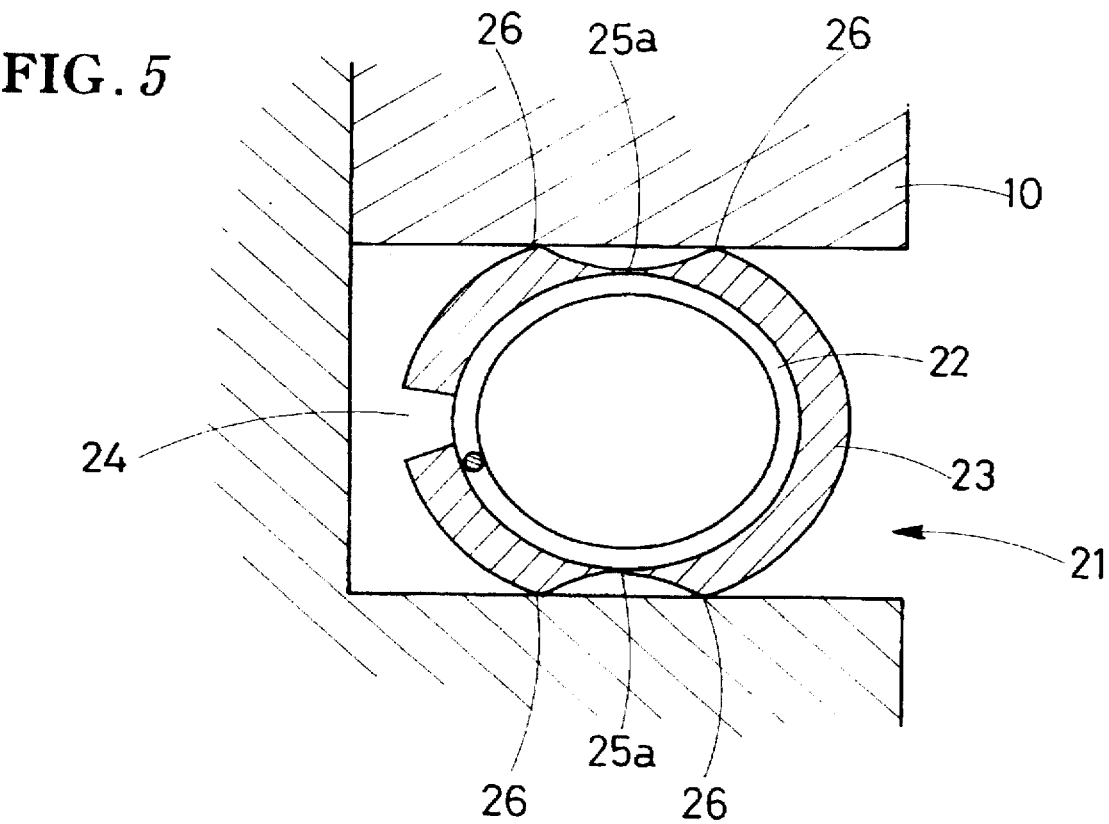
FIG. 5 is a cross-sectional view for illustrating a profile during sealing of a metal gasket of the second embodiment.
Figure 6:
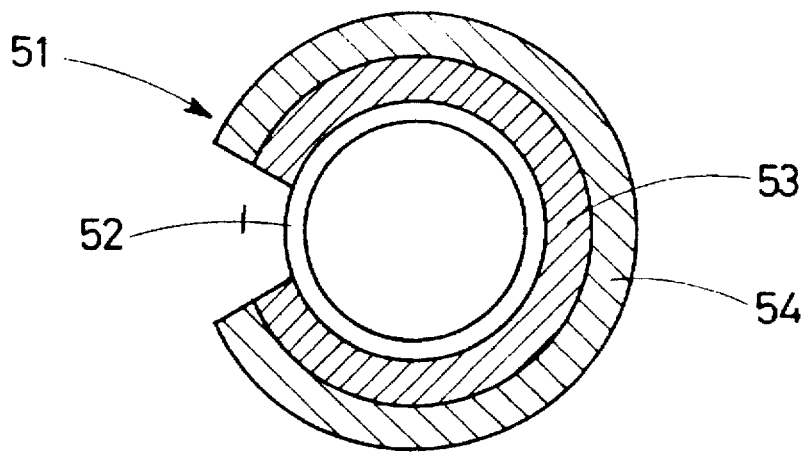
FIG. 6 is a cross-sectional view for illustrating the first example of the conventional metal gasket.
Figure 7:
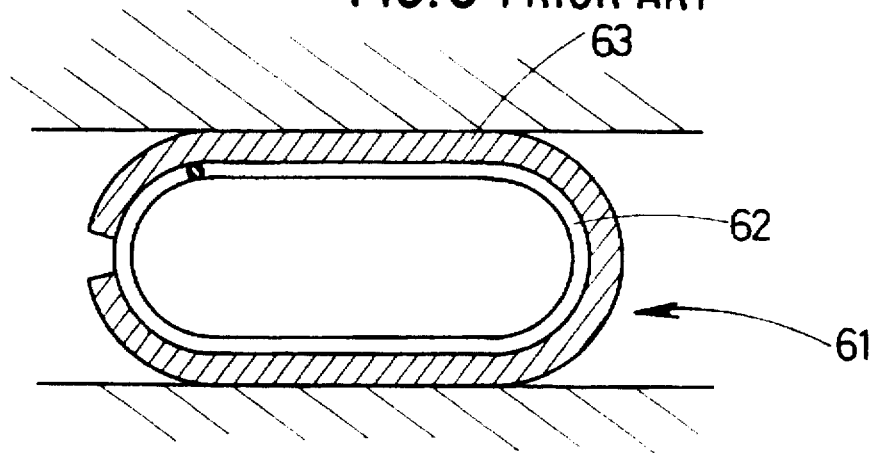
FIG. 7 is a cross-sectional view for illustrating the second example of the conventional metal gasket.
Figure 8:
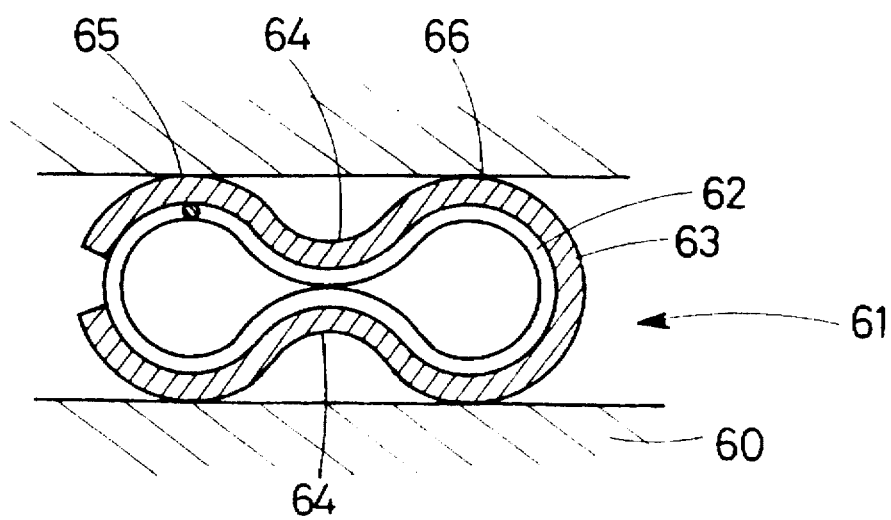
FIG. 8 is a cross-sectional view for illustrating a profile during sealing of the metal gasket of the second example.

When a metal gasket 21 on which such V-shaped grooves 25 and 25 are formed is mounted on a flange 10, projections 26 and 26 are formed at edges 25b and 25b as shown in FIG. 5 to ensure the sealing.

In detail, when a metal gasket 21 is provided on a flange 10 and a compression force is exerted from the flange 10 to the top and bottom V-shaped grooves, the metal gasket 21 is deformed to the axis center direction. When, because the V-shaped groove 25 and 25, on which the force is directly exerted with the is thinnest at the central portions 25a and 25a, these places are subjected to stress concentration.

Accordingly, as shown in FIG. 5, the central portions 25a and 25a which is subjected to the stress concentration of the sheath 23 are deflected and curved in the axis center direction. Thus, the edges 25b and 25b of the V-shaped grooves 25 and 25 form projections 26, 26 between the central portions 25a and 25a. The sharp projections 26, 26 ensure the double sealing on both of the sealing faces 10a and 10a of the flange 10.

In the metal gasket 21 of the embodiment, the forming of worked V-shaped grooves 25 and 25 allows the projections 26 and 26 to be sharper than those in the first embodiment, and the sealing stability is enhanced more. In other words, the tightening of the metal gasket 21 with smaller pressing force is sufficient for sealing.

The metal gasket of the invention is not limited to the embodiments described herein. Various modifications may be applied within the scope of the present invention.

For example, in the embodiments described hereinbefore, only flat face and V-shaped groove are shown as the configuration of the worked portion formed on the sheath, however, the worked portion may be a worked portion with ⊐-shaped, U-shaped cross-section, or other shaped cross-section as-described in the claims as long as the shape forms a thin portion for favoring the projection when compressed.

Further, for example, the metal gasket comprising one layered sheath is shown in the embodiments described hereinbefore, however, the sheath may comprises a two layered sheath or a sheath with more layers.

This invention provides a metal gasket, even with high hardness, excellent in sealing stability and capable of sealing with small pressing force because the worked portion provides local thinned portions on a metal sheath over the whole length, and the deflection to the axis direction of the sheath due to concentrated stress on the thin worked portion when the metal sheath is exerted with a force and deformed causes projections at the both sides of the deflection which projections are pressed onto the sealing face.

What is claimed is:

1. A metal gasket comprising at least one metal sheath with a C-shaped cross-section and a ring elastic core surrounded by said metal sheath, said gasket functioning to prevent leakage of fluid during contact with a sealing face and when subjected to a force in the axis center direction, wherein said metal sheath has a thin walled portion formed at a location on the periphery of said metal sheath which is to be contacted by the sealing face, said thin-walled portion of said metal sheath being thinner at the center thereof, and when a force is exerted upon said metal gasket to deform the sheath, a deflection occurs in the axis center direction as a result of the stress concentration on said thin walled portion which causes projections to be formed at both sides of the deflection, which projections are pressed onto said sealing face to prevent leakage of fluid.

2. The metal gasket as claimed in claim 1, wherein said thin walled portion is formed on diametrically opposed locations on the periphery of said metal sheath.

3. The metal gasket as claimed in claim 1, wherein said thin walled portion of said metal sheath is a flat surface.

4. The metal gasket as claimed in claim 2, wherein each said thin walled portion of said metal sheath is a flat surface.

5. The metal gasket as claimed in claim 1, wherein the cross section of said thin walled portion of said metal sheath is V-shaped.

6. The metal gasket as claimed in claim 2, wherein the cross section of said thin walled portion of said metal sheath is V-shaped.

7. The metal gasket as claimed in claim 2, said gasket having a generally toroidal shape.

8. An annular metal gasket comprising at least one metal sheath and designed for providing sealed contact with an opposing surface under an exerted force, said metal sheath having a periphery and a thin-walled surface with first edges formed on the periphery, said thin-walled surface of said metal sheath being thinner at the center thereof, and in response to a force exerted upon said gasket causing the sheath to deform and the thin-walled surface to deflect inwardly, the gasket further comprising first projections formed at the first edges which projections press into the opposing surface to prevent leakage of fluid.

9. The metal gasket as claimed in claim 8, further comprising a second thin-walled surface with second edges, said second thin-walled surface formed on the periphery at a position removed from the first thin-walled surface, and second projections formed at the second edges upon deformation of said sheath, both said first and second projections forming double sealing lines, said gasket designed for providing sealed contact with two surfaces that oppose, respectively, the two thin-walled surfaces.

10. The metal gasket as claimed in claim 8, wherein said thin-walled surface of said metal sheath is a flat surface.

11. The metal gasket as claimed in claim 9, wherein said thin-walled surfaces of said metal sheath are flat surfaces.

12. The metal gasket as claimed in claim 8, wherein the cross section of said thin-walled surface of said metal sheath is V-shaped.

13. The metal gasket as claimed in claim 9, wherein the cross-section of said thin-walled surfaces of said metal sheath is V-shaped.

14. The metal gasket as claimed in claim 8, further comprising a metal coil spring within the metal sheath.

* * * * *